United States Patent [19]

Nilsson, Sr. et al.

[11] Patent Number: 4,586,334
[45] Date of Patent: May 6, 1986

[54] SOLAR ENERGY POWER GENERATION SYSTEM

[76] Inventors: Jack E. Nilsson, Sr., 3 Stonegate Ct., Easley, S.C. 29640; Charles D. Cochran, 127 Andover Rd., Greenville, S.C. 29615

[21] Appl. No.: 693,793

[22] Filed: Jan. 23, 1985

[51] Int. Cl.[4] .......................... F02G 1/06; F03G 7/02; F01K 3/02
[52] U.S. Cl. ..................... 60/524; 60/641.8; 60/641.15; 60/659; 165/96
[58] Field of Search ................. 60/641.8, 641.15, 659, 60/524; 165/104.11, 96

[56] References Cited

U.S. PATENT DOCUMENTS 3,029,596  4/1962  Hanold et al. .................. 60/524
3,080,706  3/1963  Flynn, Jr. et al. ............ 165/DIG. 4
3,442,079  5/1969  Meijer ........................... 60/524
3,702,533  11/1972  Dirne et al. ..................... 60/524
4,091,622  5/1978  Marchesi ...................... 60/641.15

Primary Examiner—Allen M. Ostrager
Attorney, Agent, or Firm—Dority & Manning

[57] ABSTRACT

An apparatus for producing, in a controlled manner, electrical energy from a solar powered Stirling engine by storing solar energy in a phase change medium and inserting and withdrawing heat exchange means into and out of the medium on demand to supply energy input to the Stirling engine. The Stirling engine drives an electrical generator producing electricity. The electricity, in turn, is used for operating a hydrogen generator which produces hydrogen that is stored in a tank for subsequent use as a source of energy.

8 Claims, 2 Drawing Figures

SOLAR ENERGY POWER GENERATION SYSTEM

FIELD OF THE INVENTION

This invention relates generally to energy generation systems that produce electrical energy from solar energy without reliance on any other energy source. Specifically, the invention relates to a solar energy system that employs a Stirling engine to drive electricity generating means. The generated electricity is converted to hydrogen which can be converted back to electrical energy when demanded or used to generate other forms of power.

BACKGROUND OF THE INVENTION

The shortages and mounting costs of extracting fossil fuels such as oil, coal, and natural gas has caused a search for alternate sources of energy. At one time it was thought that fissile fuels which power nuclear reactors would bridge the gap when the cheap sources of fossil fuels became depleted. However, the long term availability of fissile fuels is questionable, safe breeder reactors are yet to be developed, and there is mounting concern over the safety of the existing nuclear systems. In view of all of this, there has been growing interest in solar energy systems as a means to supplement the world's energy needs.

Solar energy systems offer the advantages of being relatively safe and reliable and, obviously, are based upon a virtually inexhaustible source of energy.

Accordingly, it is a prime object of the present invention to provide a solar energy system which has high efficiency, ease of control, and reliable and continuous power output.

Exemplary of prior art solar energy systems over which the present invention has many advantages as will be seen hereinafter are the following described devices: In U.S. Pat. No. 3,983,704 which issued on Oct. 5, 1976 to Lorrell C. McFarland there is disclosed a solar energized thermodynamic motor in which solar rays heat a fluid to cause it to expand and be forced through a stand pipe to an elevated tank from which it can descend and drive a hydraulic motor. Another solar device is shown in U.S. Pat. No. 4,195,775 which issued April 1, 1980 to Edward T. Pitts in which the rays of the sun are concentrated by a mirror to heat water in a collector which moves with the mirror as the collector tracks the sun. A solar energy thermal collector which provides a high temperature thermal output in combination with a tracking system is disclosed in U.S. Pat. No. 4,210,463 which issued on July 1, 1980 to William J. D. Escher. A solar energy system which is utilized to convert water into steam for driving a turbine and generating electricity is shown in U.S. Pat. No. 4,280,328 which issued on July 28, 1981 to Claude J. Falconer. A method and apparatus for collecting, intensifying and storing solar energy which includes a hollow spherical vessel having a polished interior surface and which employs heat absorbing media such as metal shots which change from a solid state to a liquid state as solar energy is absorbed is disclosed in U.S. Pat. No 4,280,482 which issued on July 28, 1981 to Jack E. Nilsson, Sr., one of the inventors of the present invention. A method of continuously supplying a load by means of solar energy which utilizes heated molten metal and hydrogen storage is shown in U.S. Pat. No. 4,433,673 which issued to Donald E. Bierling on Feb. 28, 1984, and, an apparatus for collecting, intensifying and storing solar energy is shown in U.S. Pat. No. 4,449,515, which also issued to one of the inventors of the present invention.

Still another solar energy device has been proposed by United Sterling, Inc. Alexandria, Va. which employs a parabolic dish concentrator, a solar receiver, a Stirling heat engine, and a generator. The solar receiver takes the concentrated solar radiation from the parabolic dish and converts it into usable heat which is used to power a Stirling engine which, in turn, supplies the mechanical power needed to run an electric generator. The parabolic dish Stirling system is significantly more efficient than a photovoltaic system. Stirling engines of the type which can be employed in the present invention can be obtained from said United Stirling, Inc. and these engines have the flexibility of using either heat supplied by solar radiation or heat from gaseous or liquid fuel combustion. A Stirling engine works in a similar manner in terms of compression and expansion as does an internal combustion engine but it differs in that heat is supplied continuously and externally to the working gas which is usually hydrogen or helium and operates in a completely closed system. The thermal efficiency of such engines is relatively high.

Accordingly, one of the objects of the present invention is to provide a solar powered generating system which employs a highly efficient heat engine such as the Stirling engine.

Another object of the present invention is to provide a means for storing energy to assure continuous operation of a solar energy system.

Still another object of the present invention is to provide a means of controlling the power output of a solar powered Stirling engine by providing novel control means in connection with heat storage means.

Another object of the invention is to provide a system for generating electricity from solar energy and then converting the electrical power to hydrogen which is much easier to store for later use.

These objects are achieved and advantages are provided by the present invention which is described hereinafter.

SUMMARY OF THE INVENTION

In one aspect, the present invention is a solar energy power generation system which includes means for collecting and concentrating solar energy; heat storage means; Stirling engine means for producing power; first heat transfer means for receiving concentrated solar energy and for transferring heat to the heat storage means; and second heat transfer means for controllably transferring heat from the storage means to the Stirling engine. In another aspect, the means for collecting and concentrating solar energy is a reflective dish; and the heat transfer means includes first and second heat pipes; the heat storage means is preferably a phase change medium; and, the means for controllably transferring heat to the Stirling engine includes means for inserting and withdrawing the second heat pipe into and out of the phase change medium. When there is no immediate need for the electrical energy produced by the Stirling engine, the electrical energy is converted by a hydrogen generator into hydrogen and stored in an underground tank. When there is a demand, the hydrogen can be converted back to electricity or used as a power source in its natural state.

BRIEF DESCRIPTION OF THE DRAWINGS

For more specific description and better understanding of the invention, reference should be made to the drawings in which.

DETAILED DESCRIPTION

Figure 1:
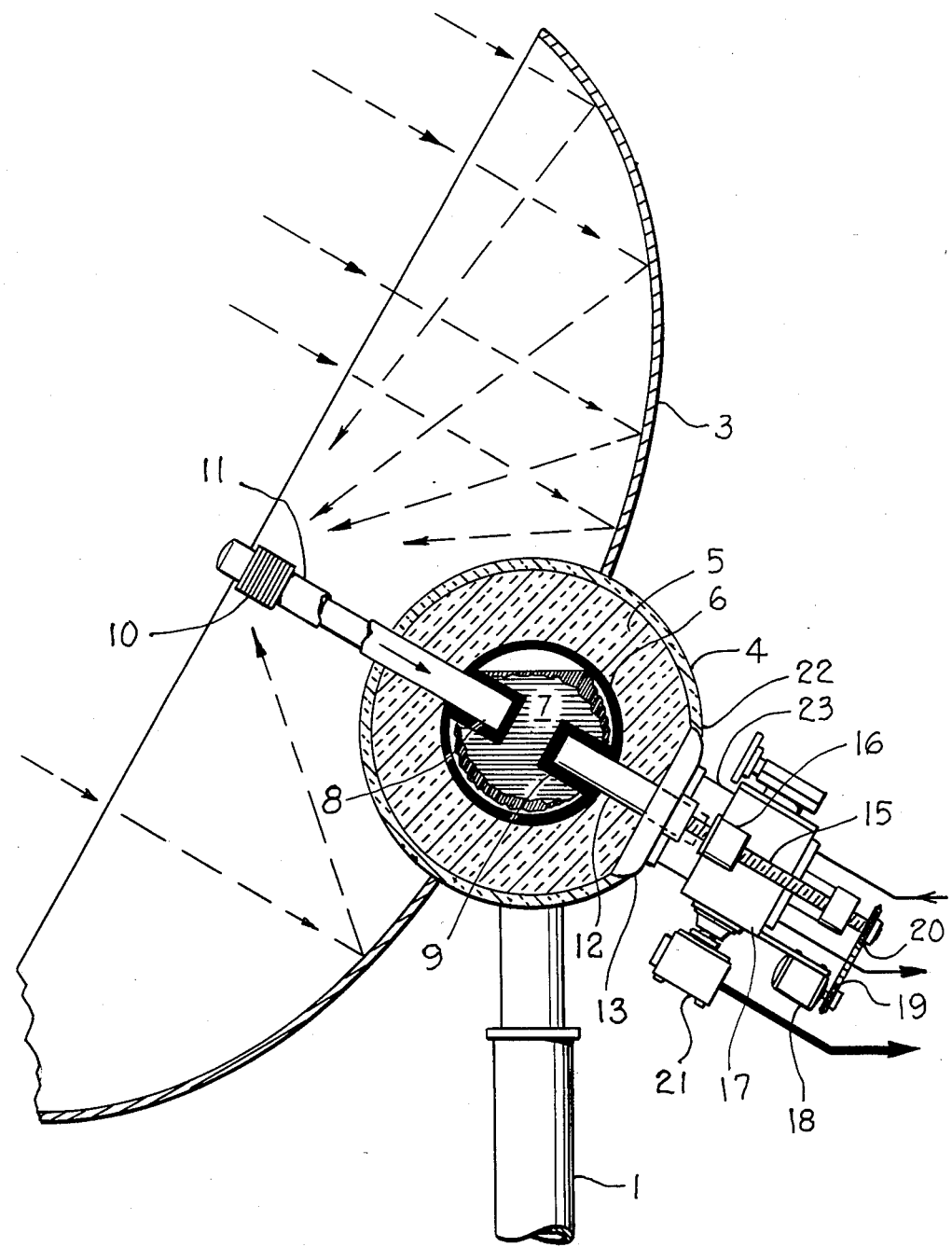
FIG. 1 is a side elevation view, partially in section, showing the solar power generation system according to the present invention; and, FIG. 2 is a schematic representation of the solar power generation system including a hydrogen generator and hydrogen storage unit.
Figure 2:
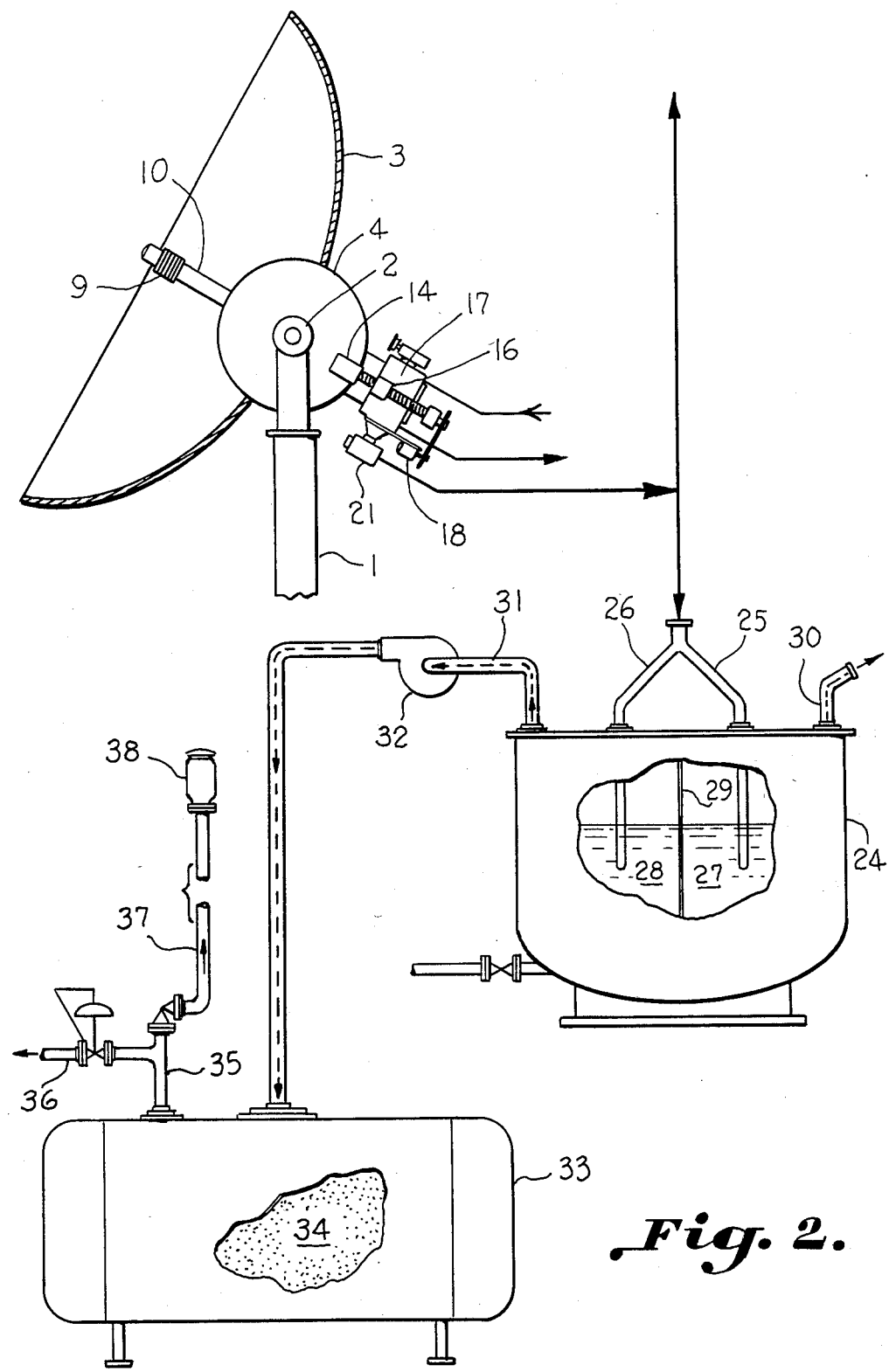

Referring to FIGS. 1 and 2, the structural elements of a preferred embodiment of the invention will be first described. Support column 1 is shown attached to and carrying the outer shell of containment vessel 4 through gimbal-type mounting 2. Containment vessel 4 carries reflective dish 3 which is shown in section with vessel 4 centrally located in dish 3. As seen in the section through vessel 4, insulating material 5 is disposed between the outer wall of the vessel and the inner shell 6. Inner shell 6 contains phase change medium 7, and opposed recesses or sockets 8 and 9 in the inner shell 6 are adapted to receive the output end of receiver heat pipe 11 and the input end of discharge heat pipe 12. Support and closure plate 13 seals off heat exchange chamber 23 and fits into and is affixed to vessel 4 at wall recess 22. Support or anchor bearing 14 (FIG. 2) is located on the outer shell of containment vessel 4 and a similar bearing is located on the opposed side of the vessel. Drive or support bolts 15 are connected to the housing 17 for the Stirling engine and can be rotated by the action of control motor 18 as it rotates motor drive gear 19 and turns the bolt drive gear 20. Also carried on the housing 17 is alternator 21 which is driven by the Stirling engine disposed within the housing 17.

Gimbal-type mountings for the containment vessel and reflective dish 3 are well known in the art and can be coupled with a suitable tracking mechanism to track the sun as it traverses the sky to keep dish 3 properly oriented at all times for maximum collection of solar energy. The reflective dish 3 is of a generally parabolic shape with a highly polished, mirror-like inner surface to direct and concentrate solar energy rays onto the finned solar receiver or solar energy absorber 10 which serves as the input of energy for heat pipe 11. Heat pipes are closed evaporation-condensation systems capable of transferring thermal energy isothermally at an extremely high rate. A refrigerant and a capillary wick are permanently sealed inside a metal tube setting up a vapor-to-liquid circulation loop. Thermal energy applied at either end of the pipe will cause the refrigerant to evaporate and travel to the other end of the pipe where thermal energy is removed. This causes the vapor to condense into liquid again. The condensed liquid then flows back to the opposite end through the capillary wick. One manufacturer of such heat pipes is the Electrondynamic Division of Hughes Aircraft Co. of Torrance, Calif.

The outer shell of containment vessel 4 will comprise stainless steel or any other suitable strong, corrosion resistant, metal. Disposed within the containment vessel 4 is insulating material 5 which can be any of a number of highly efficient insulating materials of a glass fiber or ceramic nature. Not shown, but included are supporting struts from containment vessel 4 outer wall to the inner shell 6 to carry and support the shell. The shell is preferably constructed of a ceramic or cermet material or other material which obviously must have a suitably higher melt temperature than the phase change media 7. The phase change media 7 preferably comprises metal in the form of shots which will become molten when the system is operational. Materials such as aluminum, copper, brass, bronze and other suitable metals will provide stability, be non-stratifying, and possess good latent heat content characteristics.

The Stirling engine carried within housing 17 can be the Stirling 4-95 type sold by said United Stirling, Inc. which can drive up to a 20 KWE electrical generating means such as alternator 21 to produce electric power.

In operation, the incoming solar rays represented by the arrows in FIG. 1 are reflected and concentrated upon the finned solar receiver 10 which heats the input end of pipe 11 and transfers heat to the output end positioned in socket 8. The heat output from the pipe will melt the metal or other phase change medium 7 and provide a heat source for the input end of discharge pipe 12 which is disposed in socket or recess 9. The phase change medium 7 is of sufficient mass and heat capacity to store thermal energy and will provide a steady source of heat and temperature to the discharge pipe 12. Discharge pipe 12 transfers heat to the heat exchange chamber 23 where it heats the working fluid or gas of the Stirling engine. The amount of heat transferred by the discharge pipe 12 is controlled by activating control motor 18 to turn gears 19 and 20 which turn drive bolts or screws 15 so that the pipe 12 can be inserted or withdrawn as desired from socket 9. The Stirling engine housing 17 is of greater diameter than the housing for the heat exchange chamber 23 and the two housings are concentrically arranged so that housing 23 remains stationary and housing 17 is movable. Thus, heat pipe 12 and the heat exchanger (not shown) within housing 23 are connected so that they move together. By adjusting the depth of insertion into the phase change media, which obviously increases the heat transfer surface of the heat pipe 12, and transfers more heat to the Stirling engine, the heat input into the engine can be kept relatively constant so that the electrical output will also remain constant.

In order to provide for electricity at night, a portion of the electrical energy generated during the daytime can be transferred or diverted to hydrogen generator 24 as indicated by the arrows in FIG. 2. The selected portion of the output of electrical energy from the alternator 21 is fed to the generator cell 24 where electrodes 25 and 26 are immersed in water vats 27 and 28 separated by membrane 29. The electrical current causes the water to break down into hydrogen and oxygen and oxygen is vented to atmosphere through discharge pipe 30 and the hydrogen is transferred through pipe 31 and pump 32 to storage tank 33 which is suitably filled with porous iron 35 to increase the capacity for storing hydrogen. Upon demand, hydrogen can be withdrawn through pipe 35 and sent through valve and pipe 36 to any desirable end use or a portion of the hydrogen gas can be returned through valve and pipe 37 to a combustion chamber 38 which combustion chamber is equipped with a heat exchanger to heat the working fluid for the Stirling engine in housing 17. The heated working fluid is transferred through lines indicated by the pair of upper arrows leading from the Stirling engine housing in FIG. 2.

While a preferred embodiment of the invention has been described using specific terms hereinabove, such description is for illustrative purposes only, and it is to be understood that changes and variations may be made without departing from the sphere or scope of the following claims.

We claim:

1. A solar energy power generation system comprising:
    (a) means for collecting and concentrating solar energy;
    (b) heat storage means;
    (c) Stirling engine means for producing power;
    (d) first heat transfer means for receiving said concentrated solar energy and for transferring heat to the heat storage means; and
    (e) second heat transfer means for controllably transferring heat from the storage means to the Stirling engine means and including a discharge heat pipe means for transferring heat to said Stirling engine means and further including means for inserting and withdrawing said discharge heat pipe means into and out of said heat storage means.

2. The system of claim 1 wherein the means for collecting and connecting solar energy includes a reflective dish.

3. The system of claim 1 wherein the first heat transfer means includes a receiver heat pipe.

4. The system of claim 1 wherein the heat storage means includes a phase change medium.

5. A solar energy power generation system comprising:
    (a) reflective dish means for receiving, reflecting, and concentrating solar energy;
    (b) a phase change medium for storing thermal energy;
    (c) Stirling engine means for producing power from thermal energy;
    (d) a receiver heat pipe having fins for absorbing solar radiation at one end thereof, said pipe and fins being positioned to receive the concentrated energy reflected by said dish and the other end of said pipe extending into said phase change medium to transfer heat thereto;
    (e) a discharge heat pipe, one end of said heat pipe being movably positioned in said phase change medium to absorb energy transferred thereto and the other end being disposed to transfer thermal energy to said Stirling engine; and
    (f) means for moving said second heat pipe into and out of the phase change medium to control the energy input into said Stirling engine.

6. The solar energy power generation system of claim 5 including alternator means driven by said Stirling engine to produce electrical power.

7. The solar energy power generation system of claim 5 including a ceramic coated containment vessel for said phase change medium located in the central portion of said reflective dish, said containment vessel having opposed cylindrical recesses therein extending into the phase change medium, said recesses being adapted to receive the discharge and receiver heat pipes.

8. The solar energy power generation system as set forth in claim 5 further comprising:
    an electricity generating device driven by said Stirling engine for generating electricity;
    a hydrogen generator;
    means for supplying said electricity being generated by said electricity generating device to said hydrogen generator for producing hydrogen; and
    means for storing said hydrogen.

* * * * *